United States Patent
Furuya

(10) Patent No.: US 10,679,392 B2
(45) Date of Patent: Jun. 9, 2020

(54) IMAGE SYNTHESIS APPARATUS, IMAGE SYNTHESIS METHOD, AND PROGRAM THEREOF

(71) Applicant: FUJIFILM Corporation, Tokyo (JP)

(72) Inventor: Hiroyuki Furuya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 188 days.

(21) Appl. No.: 15/892,376

(22) Filed: Feb. 8, 2018

(65) Prior Publication Data

US 2018/0268586 A1    Sep. 20, 2018

(30) Foreign Application Priority Data

Mar. 15, 2017    (JP) .................................. 2017-049941

(51) Int. Cl.
*G06T 11/60* (2006.01)
*G06T 7/136* (2017.01)
*G06K 9/00* (2006.01)

(52) U.S. Cl.
CPC .......... *G06T 11/60* (2013.01); *G06K 9/00536* (2013.01); *G06K 9/00677* (2013.01); *G06T 7/136* (2017.01); *G06T 2207/20216* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 9,235,760 B2 | 1/2016 | Yamaji et al. | |
| 9,767,579 B2 | 9/2017 | Arai | |
| 9,786,076 B2 | 10/2017 | Furuya | |
| 2014/0079322 A1* | 3/2014 | Yamaji | G06F 16/58 382/209 |
| 2014/0233851 A1* | 8/2014 | Kasuya | G06T 3/40 382/165 |

(Continued)

FOREIGN PATENT DOCUMENTS

| | | |
|---|---|---|
| JP | 2006221600 | 8/2006 |
| JP | 2006350462 | 12/2006 |

(Continued)

OTHER PUBLICATIONS

Office Action of Japan Counterpart Application, with English translation thereof, dated Mar. 24, 2020, pp. 1-6.

*Primary Examiner* — Kevin Ky
(74) *Attorney, Agent, or Firm* — JCIPRNET

(57) ABSTRACT

Provided are an image synthesis apparatus, an image synthesis method, and a program thereof, capable of determining a combination of a synthesis candidate image and a background image of which impressions match each other. Plural synthesis candidate images are input, and impression values of the plural synthesis candidate images are determined with respect to plural impression axes. Further, plural background images are input, and impression values of the plural background images are determined with respect to the plural impression axes. A combination of a synthesis candidate image and a background image having a small difference between impression values is determined. The synthesis candidate image and the background image of the determined combination are synthesized to generate a synthetic image.

14 Claims, 13 Drawing Sheets

(56) References Cited

U.S. PATENT DOCUMENTS

| | | | | |
|---|---|---|---|---|
| 2015/0206523 A1* | 7/2015 | Song | ............... | G10H 7/002 |
| | | | | 84/609 |
| 2016/0063746 A1* | 3/2016 | Furuya | ............... | G06T 11/60 |
| | | | | 382/209 |
| 2016/0321335 A1* | 11/2016 | Noguchi | ............... | G06Q 30/06 |
| 2017/0177927 A1* | 6/2017 | Fujita | ............... | G06K 9/00302 |
| 2017/0345200 A1 | 11/2017 | Furuya | | |

FOREIGN PATENT DOCUMENTS

| | | |
|---|---|---|
| JP | 5655112 | 1/2015 |
| JP | 2015162850 | 9/2015 |
| JP | 2016048408 | 4/2016 |
| JP | 2016170465 | 9/2016 |
| JP | 2017027489 | 2/2017 |
| JP | 2017045376 | 3/2017 |

\* cited by examiner

IMPRESSION AXIS: ENERGETIC-MILD
ELEGANT-MODEST
ACTIVE-STRONG
NOSTALGIC-CALM
FORMAL-QUIET

IMPRESSION AXIS: ELEGANT-MODEST

IMAGE SYNTHESIS APPARATUS, IMAGE SYNTHESIS METHOD, AND PROGRAM THEREOF

CROSS-REFERENCE TO RELATED APPLICATIONS

The present application claims priority under 35 U.S.C. § 119 to Japanese Patent Application No. 2017-049941, filed Mar. 15, 2017. Each of the above application(s) is hereby expressly incorporated by reference, in its entirety, into the present application.

BACKGROUND OF THE INVENTION

1. Field of the Invention

The present invention relates to an image synthesis apparatus, an image synthesis method, and a program thereof.

2. Description of the Related Art

A technique that pastes a synthetic target image to a template image to generate a postcard, an electronic album, a photo book, or the like has been proposed. For example, there are a technique that determines evaluation values of respective images on the basis of an image analysis result and selects images on the basis of the evaluation values to be disposed in a predetermined layout (Japanese Patent No. 5655112), and a technique that determines a template image and a target image on the basis of a final impression that is designated (JP2015-162850A), for example. Further, a technique that enhances balance between a template image and a target image to be synthesized with the template image (JP2016-170465A), a technique that finds a template image suitable for synthesis of a target image (JP2016-48408A), a technique that creates an album with a sense of unity (JP2006-350462A), or the like may also be considered.

SUMMARY OF THE INVENTION

However, in the technique disclosed in Japanese Patent No. 5655112, images are selected on the basis of evaluation values and are disposed in a predetermined layout, which does not consider enhancement of an impression of a synthetic image. In the technique disclosed in JP2015-162850A, a template image and a target image are determined so that a designated final impression is obtained, but an impression other than the designated impression is not considered. The technique disclosed in JP2016-170465A enhances balance between a template image and a target image to be synthesized with the template image, but does not consider an impression of a synthesized image. The technique disclosed in JP2016-48408A finds a template image suitable for synthesis of a target image, but can find a template image suitable for only a specific target image. The technique disclosed in JP2006-350462A calculates a color tone correction value from a color difference between a representative color of a photo image and a color of a template image to correct the color tone of the photo image, but does not consider a viewpoint of impressions of the photo image and the template image.

An object of the invention is to provide a technique capable of determining a combination of a synthesis candidate image and a background image of which impressions match each other.

An image synthesis apparatus according to the invention comprises: a synthesis candidate image input device (synthesis candidate image input means) for inputting a plurality of synthesis candidate images; a background image input device (background image input means) for inputting a plurality of background images; a synthesis candidate image impression value determination device (synthesis candidate image impression value determination means) for determining impression values of each of the plurality of synthesis candidate images input through the synthesis candidate image input device with respect to a plurality of impression axes; a background image impression value determination device (background image impression value determination means) for determining impression values of each of the plurality of background images input through the background image input device with respect to the plurality of impression axes; a combination determination device (combination determination means) for determining a combination of a synthesis candidate image and a background image having a small difference among differences between the impression values of the synthesis candidate image determined by the synthesis candidate image impression value determination device and the impression values of the background image determined by the background image impression value determination device, with respect to at least one impression axis among the plurality of impression axes; and a synthetic image generation device (synthetic image generation means) for synthesizing the synthesis candidate image and the background image of the combination determined by the combination determination device to generate a synthetic image.

The invention also provides an image synthesis method suitable for the image synthesis apparatus. That is, the method comprises: inputting a plurality of synthesis candidate images, using a synthesis candidate image input device; inputting a plurality of background images, using a background image input device; determining impression values of each of the plurality of synthesis candidate images input through the synthesis candidate image input device with respect to a plurality of impression axes, using a synthesis candidate image impression value determination device; determining impression values of each of the plurality of background images input through the background image input device with respect to the plurality of impression axes, using a background image impression value determination device; determining a combination of a synthesis candidate image and a background image having a small difference among differences between the impression values of the synthesis candidate image determined by the synthesis candidate image impression value determination device and the impression values of the background image determined by the background image impression value determination device, with respect to at least one impression axis among the plurality of impression axes, using a combination determination device; and synthesizing the synthesis candidate image and the background image of the combination determined by the combination determination device to generate a synthetic image, using a synthetic image generation device.

Further, the invention may provide an image synthesis apparatus that executes, using a processor circuit, a process of inputting a plurality of synthesis candidate images; a process of inputting a plurality of background images; a process of determining impression values of each of the plurality of input synthesis candidate images with respect to a plurality of impression axes; a process of determining impression values of each of the plurality of input background images with respect to the plurality of impression axes; a process of determining a combination of a synthesis candidate image and a background image having a small difference among differences between the impression values of the determined synthesis candidate image and the impression values of the determined background image, with respect to at least one impression axis among the plurality of impression axes; and a process of synthesizing the synthesis candidate image and the background image of the determined combination to generate a synthetic image.

The invention also provides a computer-readable program that controls a computer of the image synthesis apparatus and a recording medium on which the program is stored.

The image synthesis apparatus may further comprise a display control device (display control means) for displaying the synthetic image generated by the synthetic image generation device.

The image synthesis apparatus may further comprise a first impression axis name display control device (first impression axis name display control means) for displaying a name of the at least one impression axis.

For example, the synthesis candidate image impression value determination device performs the determination by calculating the impression values of each of the plurality of synthesis candidate images input through the synthesis candidate image input device with respect to the plurality of impression axes, and for example, the background image impression value determination device performs the determination by calculating the impression values of each of the plurality of background images input through the background image input device with respect to the plurality of impression axes.

The synthesis candidate image impression value determination device may determine the impression values of the synthesis candidate image on the basis of impression values stored in a synthesis candidate image impression value storage device (synthesis candidate image impression value storage means) for storing the impression values of each of the plurality of synthesis candidate images input through the synthesis candidate image input device with respect to the plurality of impression axes, and the background image impression value determination device may determine the impression values of the background image on the basis of impression values stored in a background image impression value storage device (background image impression value storage means) for storing the impression values of each of the plurality of background images input through the background image input device with respect to the plurality of impression axes.

The image synthesis apparatus may further comprise an impression axis designation device (impression axis designation means) for designating the plurality of impression axes.

For example, the combination determination device determines the combination of the synthesis candidate image and the background image with respect to an impression axis on which the smallest difference among the differences between the impression values of the synthesis candidate image determined by the synthesis candidate image impression value determination device and the impression values of the background image determined by the background image impression value determination device is present.

The image synthesis apparatus may further comprise: a second impression axis name display control device (second impression axis name display control means) for displaying names of the plurality of impression axes; and an impression axis name designation device (impression axis name designation means) for designating a name of at least one impression axis among the names of the plurality of impression axes displayed under the control of the second impression axis name display control device. In this case, for example, the combination determination device determines the combination of the synthesis candidate image and the background image having the small difference among the differences between the impression values of the synthesis candidate image determined by the synthesis candidate image impression value determination device and the impression values of the background image determined by the background image impression value determination device, with respect to an impression axis corresponding to the name of the at least one impression axis designated by the impression axis name designation device.

The image synthesis apparatus may further comprise a first impression axis determination device (first impression axis determination means) for determining impression axes for which the number of combinations of synthesis candidate images and background images, having a small difference between an impression value of one synthesis candidate image among the plurality of synthesis candidate images and an impression value of one background image among the plurality of background images, is equal to or greater than a threshold value, as the plurality of impression axes.

The image synthesis apparatus may further comprise a third impression axis name display control device (third impression axis name display control means) for displaying the names of the impression axes determined by the first impression axis determination device in an ascending order of the differences.

The image synthesis apparatus may further comprise a second impression axis determination device (second impression axis determination means) for determining the plurality of impression axes on the basis of distribution of impression values of a plurality of synthesis candidate images and distribution of impression values of a plurality of background images in a region defined by two impression axes or three impression axes.

For example, the second impression axis determination device determines at least one impression axis among an impression axis corresponding to an impression in a direction in which the distribution of the impression values of the plurality of synthesis candidate images is wide, an impression axis corresponding to an impression in a direction in which the distribution of the impression values of the plurality of synthesis candidate images is narrow, an impression axis corresponding to an impression in a direction in which the distribution of the impression values of the plurality of background images is wide, or an impression axis corresponding to an impression in a direction in which the distribution of the impression values of the plurality of background images is narrow.

According to the invention, a plurality of synthesis candidate images and a plurality of background images are input to an image synthesis apparatus. Impression values of each of the plurality of synthesis candidate images that are input are determined with respect to a plurality of impression axes, and impression values of each of the plurality of background images that are input are determined with respect to the plurality of impression axes. A combination of a synthesis candidate image and a background image having a small difference among differences between the impression values of the synthesis candidate images and the impression values of the background images is determined with respect to the plurality of impression axes. A synthetic image obtained by synthesizing the determined synthesis candidate image and background image is generated. Thus, a synthetic image generated by synthesizing a synthesis candidate image and a background image of which impressions match each other is obtained.

DESCRIPTION OF THE PREFERRED EMBODIMENTS

First Embodiment

Figure 1:
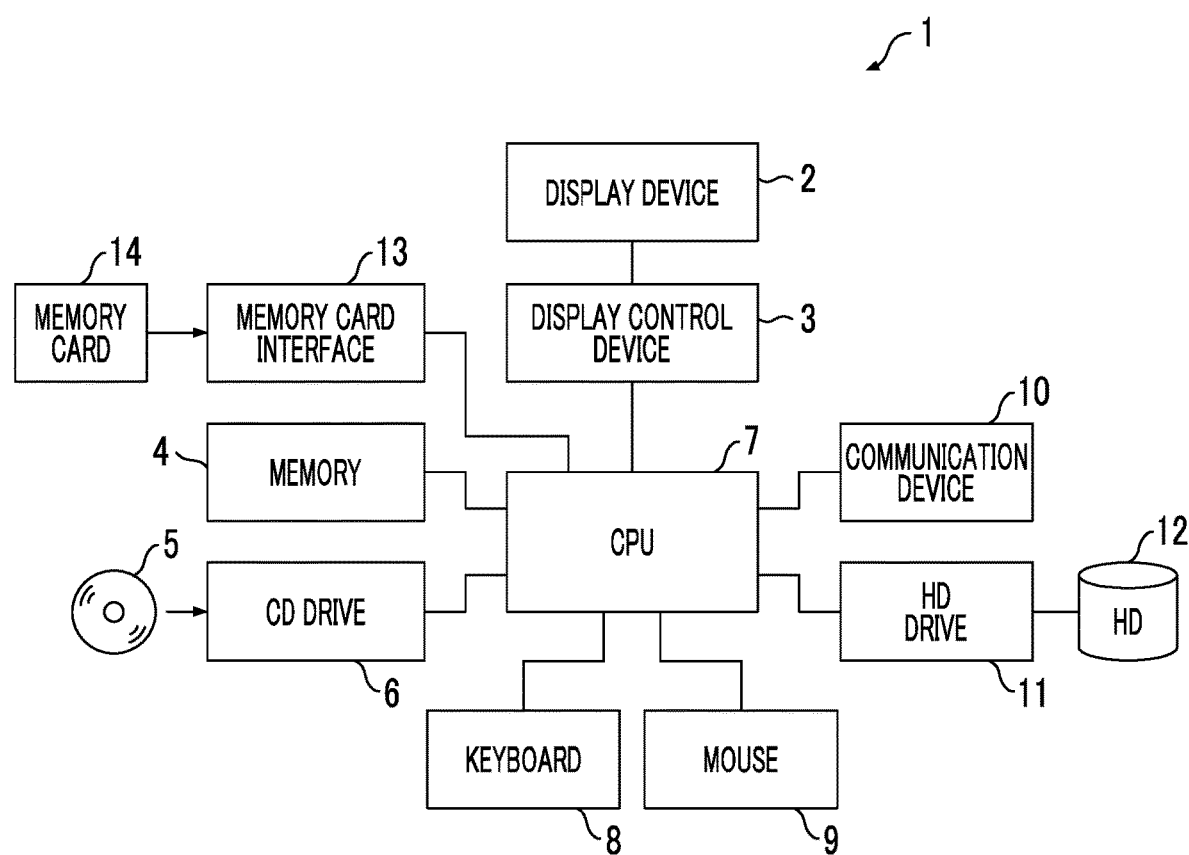
FIG. 1 is a block diagram showing an electric configuration of an image synthesis apparatus.

FIG. 1 is a block diagram showing an embodiment of the invention, and shows an electric configuration of an image synthesis apparatus 1.

Overall operations of the image synthesis apparatus 1 are controlled by a central processing unit (CPU) 7.

The image synthesis apparatus 1 includes a display device 2 controlled by a display control device 3, a memory 4 that temporarily stores data, a compact disc (CD) drive 6 for having access to a compact disc 5, and a keyboard 8 and a mouse 9 for causing a user to give a command to the image synthesis apparatus 1. Further, the image synthesis apparatus 1 also includes a hard disk (HD) drive 11 for having access to a hard disk (HD) 12, and a communication device 10 for communicating with a server (not shown) or the like. In addition, the image synthesis apparatus 1 also includes a memory card interface 13 that reads an image filter or the like stored in a memory card 14.

The compact disc 5 in which a program that controls operations (which will be described later) is stored is loaded into the image synthesis apparatus 1, and the program stored in the compact disc 5 is read by the compact disc drive 6. As the read program is installed in the image synthesis apparatus 1, the image synthesis apparatus 1 performs the operations (which will be described later). The program that controls the image synthesis apparatus 1 is not only read from a recording medium such as the compact disc 5, but may also be received as a program that is transmitted through the Internet.

Figure 2:
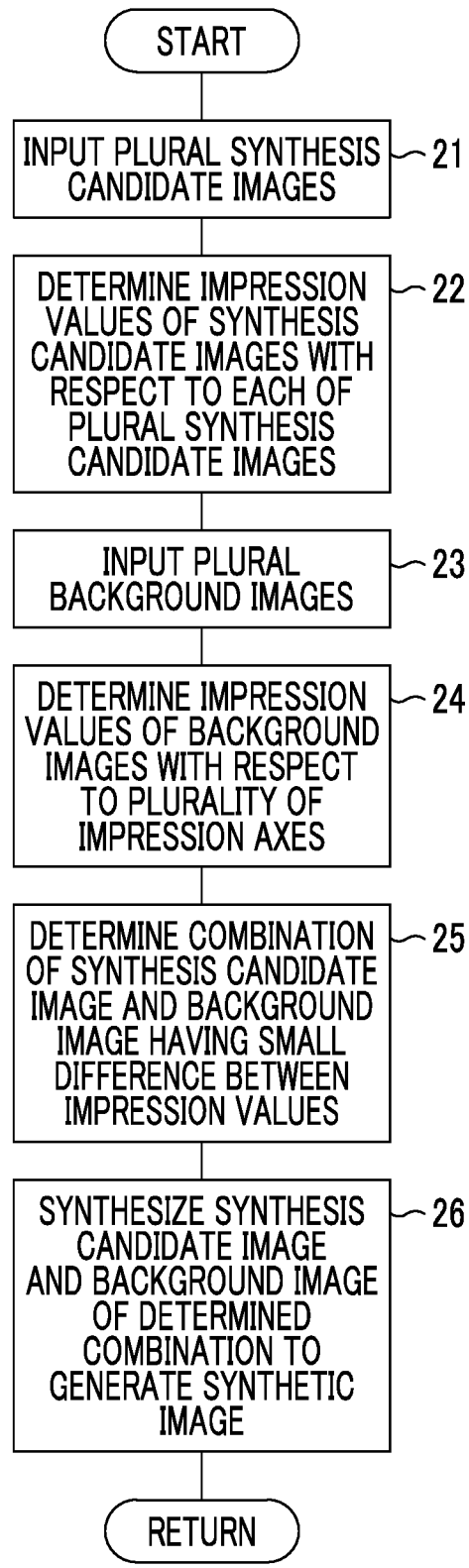
FIG. 2 is a flowchart showing a processing procedure of the image synthesis apparatus.
Figure 3:
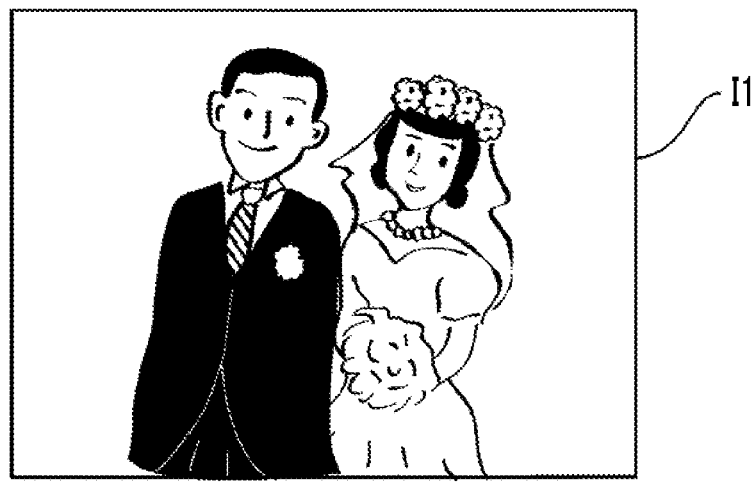
FIG. 3 is a diagram showing an example of a synthesis candidate image.
Figure 4:
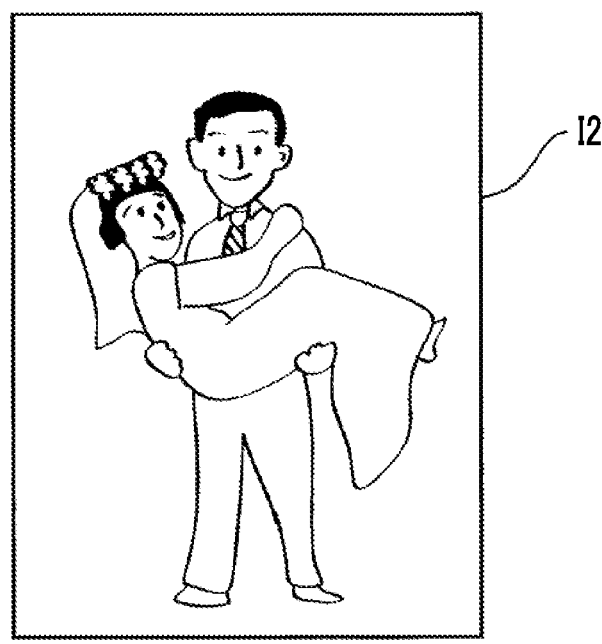
FIG. 4 is a diagram showing an example of a synthesis candidate image.
Figure 5:
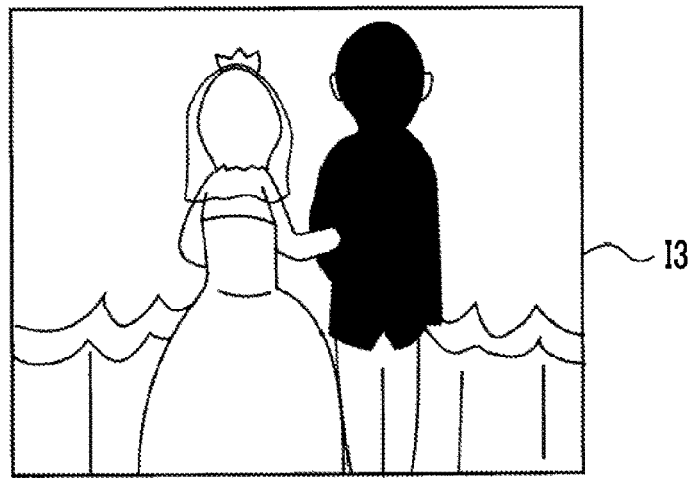
FIG. 5 is a diagram showing an example of a synthesis candidate image.
Figure 6:
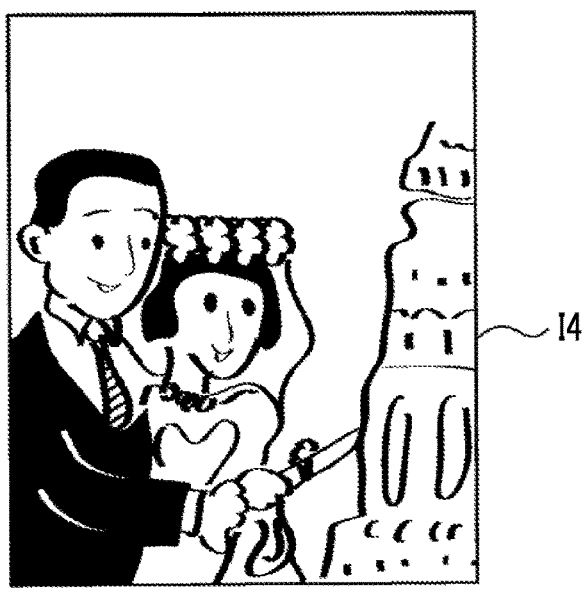
FIG. 6 is a diagram showing an example of a synthesis candidate image.
Figure 7:
FIG. 7 is a diagram showing an example of a synthesis candidate image.

FIG. 2 is a flowchart showing a processing procedure of the image synthesis apparatus 1.

A user loads the memory card 14 in which (a file indicating) a plurality of synthesis candidate images is stored into the image synthesis apparatus 1, and inputs the plurality of synthesis candidate images to the image synthesis apparatus 1 through the memory card interface 13 (a synthesis candidate image input device) (step 21). All images stored in the memory card 14 may be used as synthesis candidate images. In a case where a folder is formed in the memory card 14 and images are stored in the folder, the folder may be designated, and all images stored in the designated folder may be used as synthesis candidate images to be input to the image synthesis apparatus 1. The synthesis candidate images are not limited to images stored in the memory card 14, and images stored in the compact disc 5 and images stored in the hard disk 12 may be designated and the designated images may be used as the synthesis candidate images.

FIGS. 3 to 7 are examples of synthesis candidate images I1 to I5 that form a plurality of synthesis candidate images input to the image synthesis apparatus 1.

In this embodiment, it is assumed that the synthesis candidate images I1 to I5 shown in FIGS. 3 to 7 are input to the image synthesis apparatus 1. All the synthesis candidate images I1 to I5 are images captured at a wedding ceremony.

In a case where the plurality of synthesis candidate images I1 to I5 are input to the image synthesis apparatus 1, impression values of the plurality of synthesis candidate images I1 to I5, that is, the synthesis candidate images I1, I2, I3, I4, and I5 are determined by the CPU 7 (a synthesis candidate image impression value determination device) with respect to a plurality of impression axes (step 22 in FIG. 2).

Figure 8:
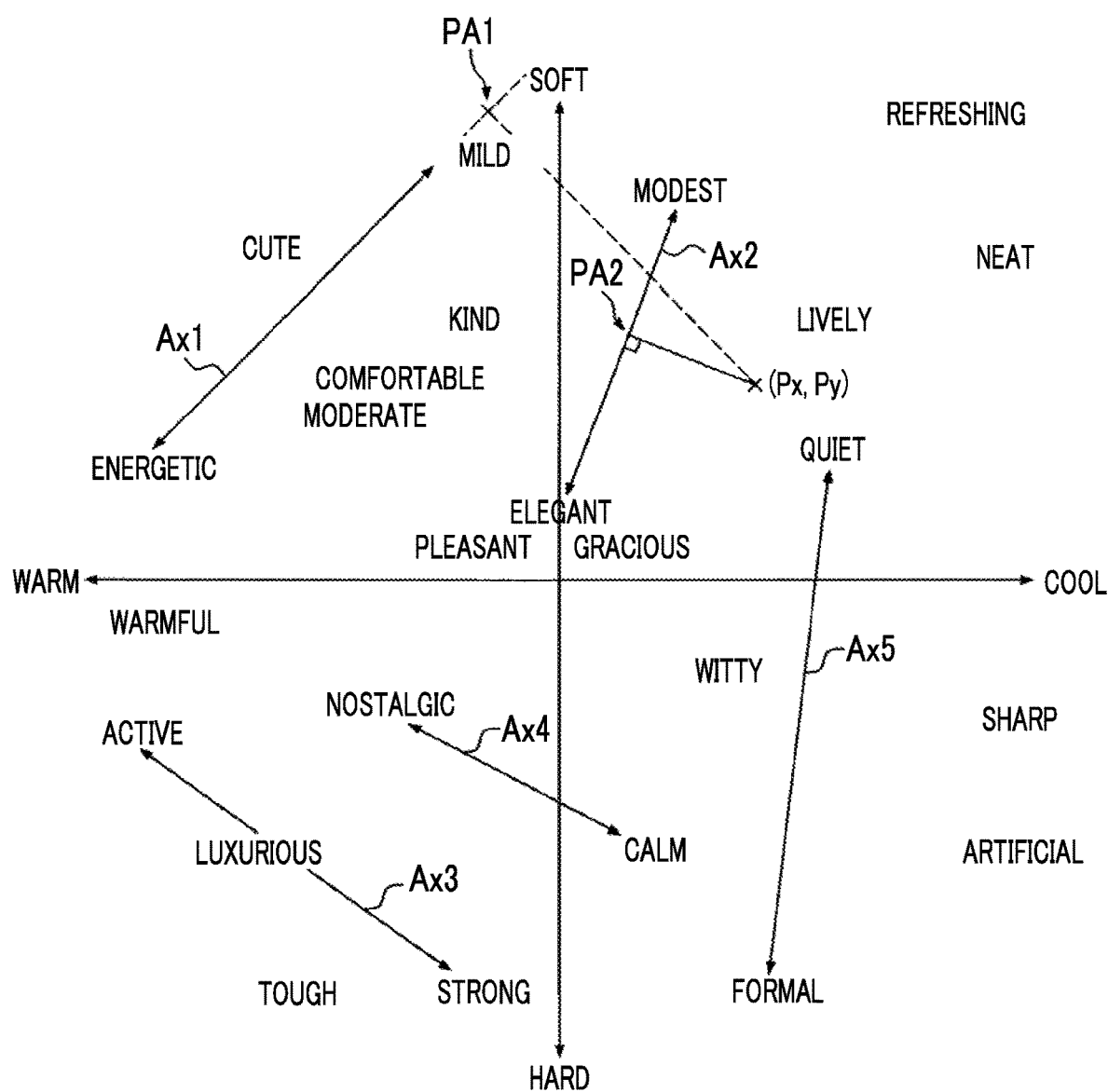
FIG. 8 is a diagram showing an example of an impression region.
Figure 9:
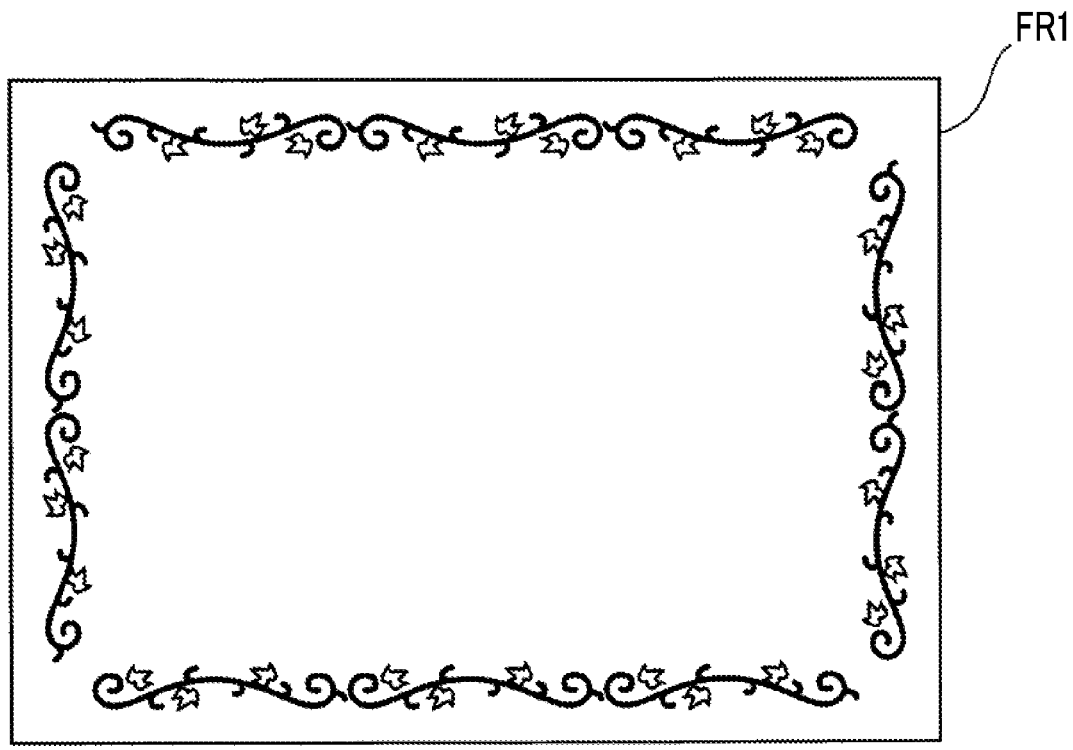
FIG. 9 is a diagram showing an example of a background image.
Figure 10:
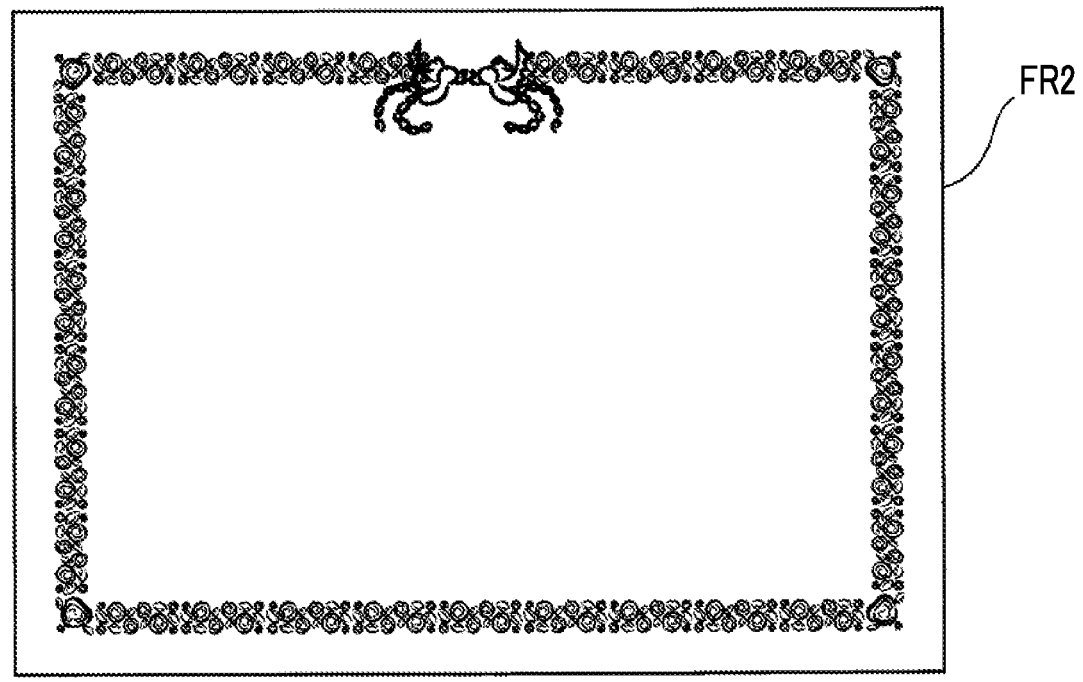
FIG. 10 is a diagram showing an example of a background image.
Figure 11:
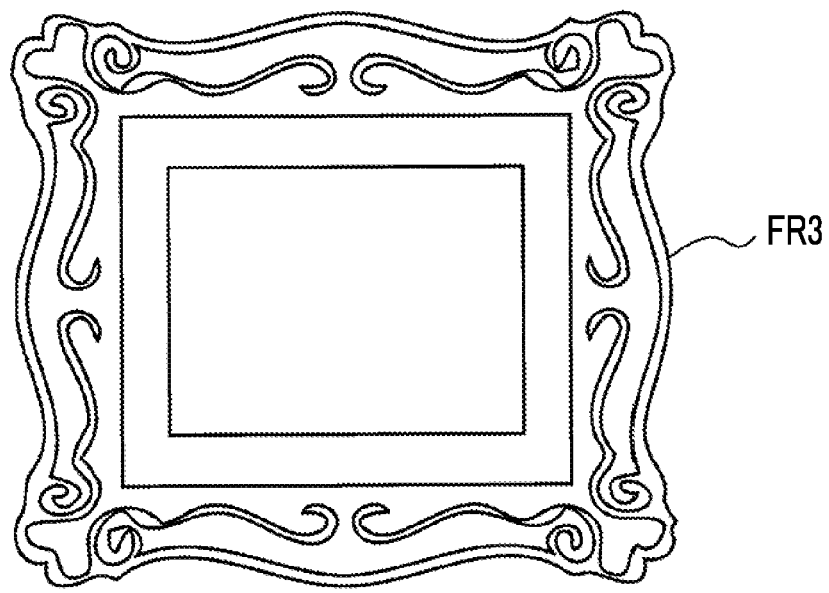
FIG. 11 is a diagram showing an example of a background image.
Figure 12:
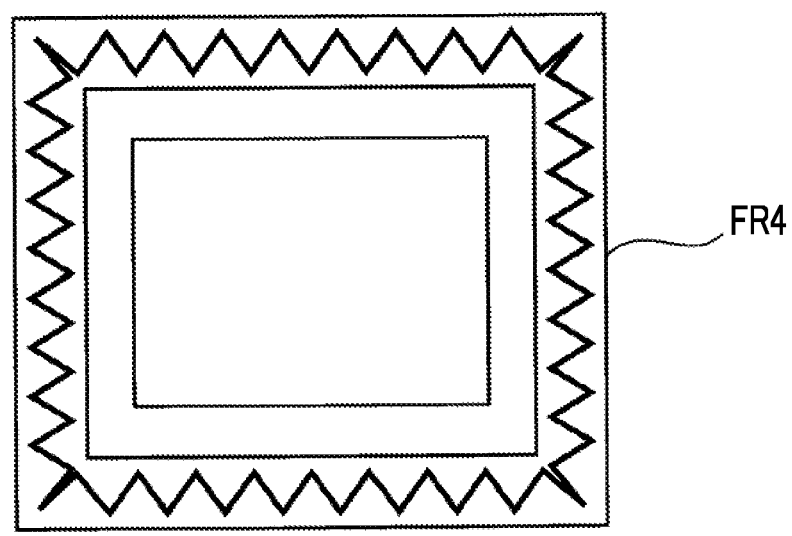
FIG. 12 is a diagram showing an example of a background image.
Figure 13:
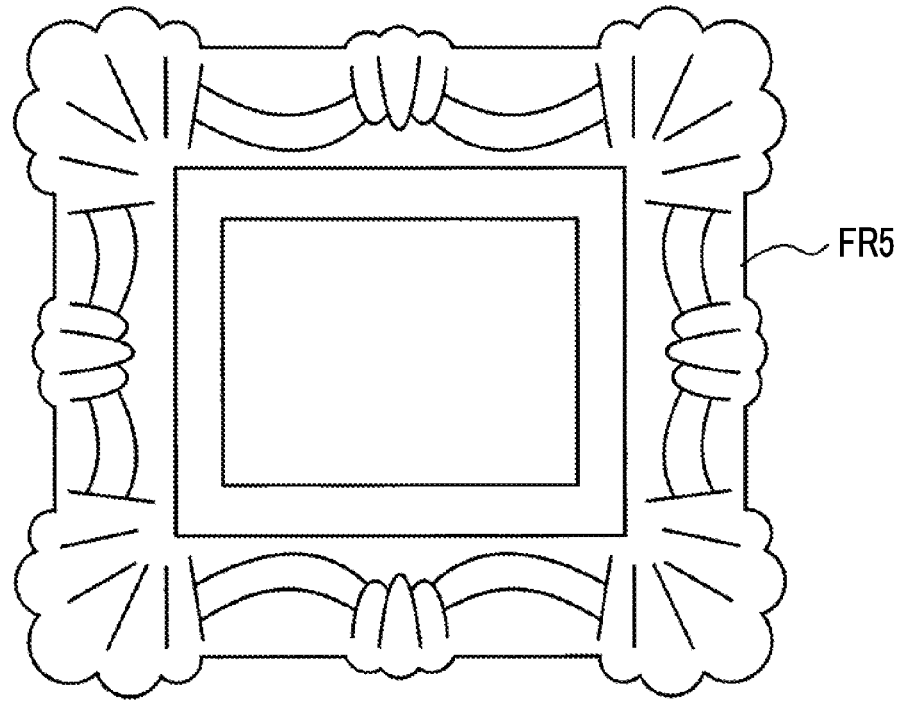
FIG. 13 is a diagram showing an example of a background image.

FIG. 8 is a diagram showing an example of an impression region defined by two standard impression axes that are determined in advance.

A transverse axis among the standard impression axes in the impression region is defined by respective names of impression axes of "warm" and "cool", and a longitudinal axis among the standard impression axes in the impression region is defined by respective names of impression axes of "soft" and "hard".

In the impression region shown in FIG. 8, sensitivity words indicating impressions such as "mild", "cute" or the like corresponding to impression values defined by the standard impression axes are distributed.

In this embodiment, five impression axes Ax1 to Ax5 are determined in advance. The first impression axis Ax1 is defined by sensitivity words indicating an "energetic" impression and a "mild" impression. The second impression axis Ax2 is defined by sensitivity words indicating an "elegant" impression and a "modest" impression. The third impression axis Ax3 is defined by sensitivity words indicating an "active" impression and a "strong" impression. The fourth impression axis Ax4 is defined by sensitivity words indicating a "nostalgic" impression and a "calm" impression. The fifth impression axis Ax5 is defined by sensitivity words indicating a "formal" impression and a "quiet" impression.

An impression value corresponding to "warm" and "cool" and a standard impression value corresponding to "soft" and "hard" are stored in a header of an image file of each of the synthesis candidate images I1, I2, I3, I4, and I5. The respective impression values are determined by the CPU 7 with respect to the plurality of impression axes, using the standard impression values. For example, it is assumed that standard impression values indicated by coordinates (Px, Py) are stored in a header (a synthesis candidate image impression value storage device) of an image file of the synthesis candidate image I1. In this case, an impression value of the synthesis candidate image I1 with respect to the second impression axis Ax2 becomes a value, when a perpendicular line is drawn from the position of the coordinates (Px, Py) to the second impression axis Ax2, indicated by an intersection PA2 of the perpendicular line and the second impression axis Ax2. This is similarly applied to the first impression axis Ax1, the third impression axis Ax3, the fourth impression axis Ax4, the fifth impression axis Ax5, so that impression values with respect to the respective impression axes are obtained. In a case where any impression axis among the first to fifth impression axes Ax1 to Ax5 and a perpendicular line, when drawn from the coordinates (Px, Py) indicating the standard impression values stored in the header of the image file, do not intersect each other, a configuration in which an impression value corresponding to the impression axis cannot be calculated may be used, or a configuration in which an impression value close to an intersection where an extension of the impression axis and the perpendicular line intersect each other is set as the impression value corresponding to the impression axis may be used. For example, even if the perpendicular line is drawn from the coordinates (Px, Py) indicating the standard impression values of the synthesis candidate image I1 to the first impression axis Ax1, an intersection is not present within the first impression axis Ax1. In such a case, a value of an impression ("mild") of the first impression axis Ax1 close to an intersection PA1 obtained by drawing the perpendicular line from the coordinates (Px, Py) indicating the standard impression values of the synthesis candidate image I1 to an extension line of the first impression axis Ax1, as indicated by a chain line, may be set as an impression value of the image I1 on the first impression axis Ax1. Further, the impression value may be determined by other methods.

Subsequently, a plurality of background images is input to the image synthesis apparatus 1 (step 23 in FIG. 2). In this case, similarly, a user loads the memory card 14 in which (a file indicating) the plurality of background images is stored into the image synthesis apparatus 1, and inputs the plurality of background images to the image synthesis apparatus 1 through the memory card interface 13 (a background image input device). All images stored in the memory card 14 may be used as background images. In a case where a folder is formed in the memory card 14 and images are stored in the folder, the folder may be designated, and all images stored in the designated folder may be used as background images to be input to the image synthesis apparatus 1. The background images are not limited to images stored in the memory card 14, and images stored in the hard disc 12 and images stored in the compact disc 5 may be designated and the designated images may be used as the background images. The background image is not limited to an image for which a region where images are synthesized is defined, such as a mount image or a template image, and also includes an image such as an image indicating a part of a simple wall.

FIGS. 9 to 13 are diagrams showing examples of background images FR1 to FR5.

In this embodiment, it is assumed that the background images FR1 to FR5 shown in FIGS. 9 to 13 are input to the image synthesis apparatus 1. All of the background images FR1 to FR5 are images in which a region where images are synthesized is defined in advance, but as described above, may be images in which a region where images are synthesized is not defined, such as wall images.

In a case where the plurality of background images FR1 to FR5 is input to the image synthesis apparatus 1, impression values with respect to the plurality of impression axes are determined by the CPU 7 (a background image impression value determination device) with respect to each of the plurality of background images FR1 to FR5 (step 24 in FIG. 2). Standard impression values are stored in a header (a background image impression value storage device) of an image file indicating each of the background images FR1 to FR5 are stored in a similar way to the synthesis candidate image I1 to I5 with respect to each of the background images FR1 to FR5. In a similar way to the determination of the impression values of the synthesis candidate images I1 to I5 with respect to the first to fifth impression axis Ax1 to Ax5, impression values of the background images FR1 to FR5 with respect to the first to fifth impression axes Ax1 to Ax5 may be determined.

In a case where the impression values of the plurality of synthesis candidate images I1 to I5 with respect to the first to fifth impression axis Ax1 to Ax5 and the impression values of the plurality of background images FR1 to FR5 with respect to the first to fifth impression axes Ax1 to Ax5 are determined, a combination of a synthesis candidate image and a background image having a small difference among differences between the impression values of the synthesis candidate images I1 to I5 and the impression values of the background images FR1 to FR5 is determined by the CPU 7 (a combination determination device) with respect to at least one impression axis among the plurality of impression axes Ax1 to Ax5 (step 25 in FIG. 2).

Table 1 is an example of a table indicating impression values determined as described above.

TABLE 1

| Impression axis | | Ax1 | Ax2 | Ax3 | Ax4 | Ax5 |
| --- | --- | --- | --- | --- | --- | --- |
| Synthesis candidate image | I1 | L3 | L2 | L2 | L3 | L3 |
| | I2 | L2 | L3 | L3 | L4 | L4 |
| | I3 | L5 | L4 | L4 | L5 | L1 |
| | I4 | L4 | L3 | L3 | L4 | L4 |
| | I5 | L5 | L5 | L4 | L3 | L3 |
| Background image | FR1 | L1 | L1 | L3 | L4 | L2 |
| | FR2 | L3 | L1 | L4 | L4 | L1 |
| | FR3 | L3 | L1 | L5 | L3 | L1 |
| | FR4 | L2 | L3 | L3 | L4 | L4 |
| | FR5 | L2 | L1 | L1 | L5 | L4 |

The impression values of the synthesis candidate images I1 to I5 with respect to the first to the fifth impression axes Ax1 to Ax5 and the impression values of the background images FR1 to FR5 with respect to the first to fifth impression axes Ax1 to Ax5 are stored respectively. In Table 1 (this is similarly applied to Table 2 and Table 3 which will be described later), L1, L2, L3, L4, and L5 represent impression values on respective impression axes of the first to fifth impression axes Ax1 to Ax5. In Table 1 (this is similarly applied to Table 2 and Table 3 which will be described later), the impression values are represented at five stages from level L1 to level L5. However, the impression values may be represented at a plurality of stages other than 5 stages. Alternatively, the impression values may be displayed by values obtained by calculation including numerical values after the decimal point, instead of being divided into a plurality of stages.

Figure 14:
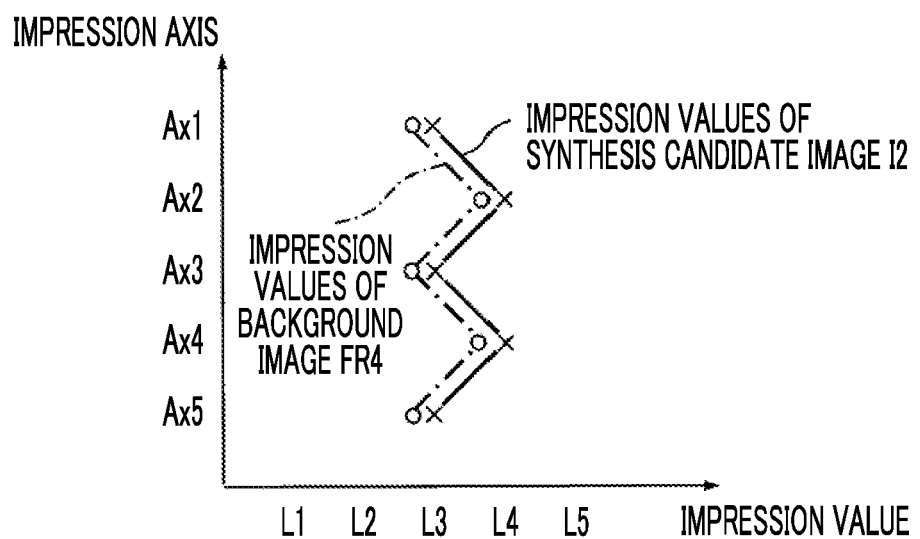
FIG. 14 a diagram showing a relationship between an impression value and an impression axis.

FIG. 14 shows a relationship between impression values and impression axes.

FIG. 14 shows a relationship between impression values of the synthesis candidate image I2 with respect to the first to fifth impression axes Ax1 to Ax5 and impression values of the background image FR4 with respect to the first to fifth impression axes Ax1 to Ax5.

The impression values of the synthesis candidate image I2 with respect to the first to fifth impression axes Ax1 to Ax5 and the impression values of the background image FR4 with respect to the first to fifth impression axes Ax1 to Ax5 match each other with respect to all of the first to fifth impression axes Ax1 to Ax5. Here, it is determined that differences between the impression values of the synthesis candidate image I2 with respect to the first to fifth impression axes Ax1 to Ax5 and the impression values of the background image FR4 with respect to the first to fifth impression axes Ax1 to Ax5 are not present, and thus, the differences are small. Thus, the synthesis candidate image I2 and the background image FR4 are synthesized by the CPU 7 (a synthetic image generation device) to generate a synthetic image (step 26 in FIG. 2). The term "small difference" means that a value of the difference is equal to or smaller than a threshold value, or that combinations having small differences equal to or smaller than the threshold value are arranged in the order from a combination having the smallest difference, for example.

Figure 15:
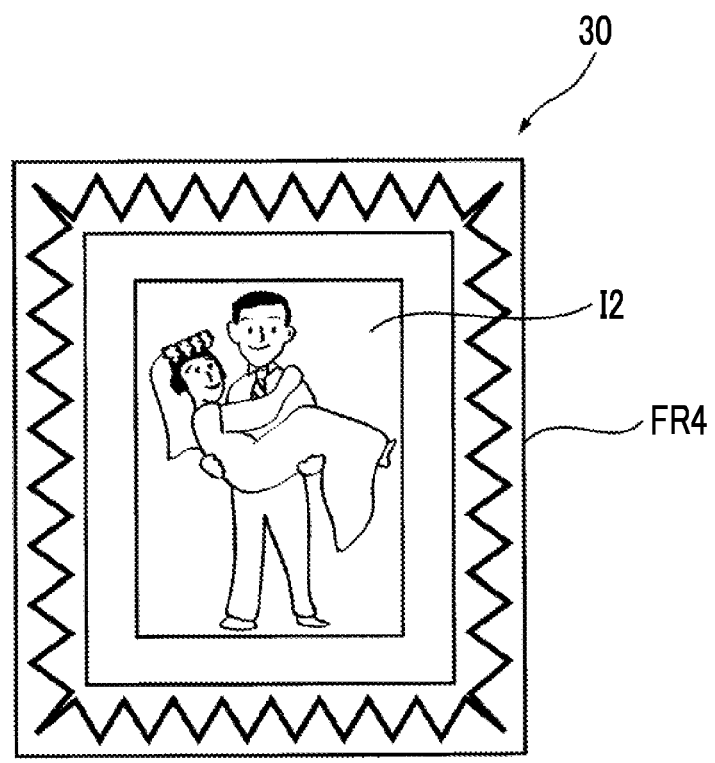
FIG. 15 is a diagram showing an example of a synthetic image.

FIG. 15 is a diagram showing an example of a generated synthetic image 30.

The synthetic image 30 is an image obtained by synthesizing the synthesis candidate image I2 and the background image FR4 as described above. The synthesis candidate image I2 and the background image FR4 has small differences between respective impression values with respect to the first impression axis Ax1 to the fifth impression axis Ax5. With respect to each impression axis of the first impression axis Ax1 to the fifth impression axis Ax5, images having the same impression are synthesized. Thus, a user does not feel discomfort for an impression given by the synthetic image 30.

In FIG. 15, names of impression axes having small differences between the impression values of the synthesis candidate image I2 and the impression values of the background image FR4, that is, a name of an impression axis defined by "energetic" and "mild", a name of an impression axis defined by "elegant" and "modest", a name of an impression axis defined by "active" and "strong", a name of an impression axis defined by "nostalgic" and "calm", and a name of an impression axis defined by "formal" and "quiet" are displayed under the synthetic image 30 under the control of the display control device 3 (a first impression axis name display control device). Since the names of the impression axes are displayed, a user can understand an impression axis where a difference between impression values of the synthesis candidate image I2 and the background image FR4 is small among the impression axes, in the synthetic image 30.

In the above-described embodiment, the impression values of the synthesis candidate images I1 to I5 and the background images FR1 to FR5 are stored in a header of each image file, but in a case where the impression values are not stored in the header of the image file, it is possible to calculate impression value as described later.

Table 2 is an example of an impression value storage table in which impression values with respect to multiple sample synthesis candidate images are stored.

TABLE 2

| Impression axis | Sample image No. | Impression value | Item | | |
|---|---|---|---|---|---|
| | | | Gender | Facial expression | — |
| Ax1 | No. 1 | L2 | Male | Smiling | — |
| | No. 2 | L3 | Female | Serious | — |
| | No. 3 | L4 | Female | Smiling | — |
| | . . . | . . . | . . . | . . . | . . . |
| Ax2 | No. 1 | L3 | Male | Smiling | — |
| | No. 2 | L2 | Female | Smiling | — |
| | No. 3 | L1 | Male | Serious | — |
| | . . . | . . . | . . . | . . . | — |
| . . . | . . . | . . . | . . . | . . . | — |

The impression value storage table stores impression values with respect to sample synthesis candidate images for each of the impression axes Ax1 to Ax5 (in which the impression axes Ax1 to Ax5 are not limiting). Categories are stored for each item such as gender, facial expression or the like, in accordance with the impression values. For example, in the case of the "gender" item, a "male" category or a "female" category is stored. In the case of the "facial expression" item, a "smiling" category or a "serious" category is stored. When an impression value with respect to a certain impression axis is represented as "f" (impression axis), a category is represented as x, and a coefficient of the category is represented as "a", the impression value "f" (impression axis) with respect to the certain impression axis is expressed by Formula (1) using mathematical quantification theory class 1. Here, in a case where any one of categories corresponds to an image, "1" is given, and in the other case, "0" is given.

$$f(\text{impression axis}) = \Sigma ax \qquad \text{Formula (1)}$$

For example, when a user subjectively inputs the impression value L2 on the impression axis Ax1 with respect to the sample synthesis candidate image No. 1, in a case where a subject corresponds to "male", "1" is given, and in a case where the subject corresponds to "female", "0" is given. In a case where a facial expression of the subject is "smiling", "1" is given, and in a case where the facial expression of the subject is "serious", "0" is given. Then, Formula (2) is established.

$$L2 = a1 \times (\text{male}) + a2 \times (\text{smile}) \ldots a1 + a2 \ldots \qquad \text{Formula (2)}$$

In a case where the user subjectively inputs an impression value of a different sample synthesis candidate image No. 2 or the like in advance, with respect to the impression axis Ax1, multiple expressions corresponding to Formula (2) are obtained. Further, the user subjectively inputs in advance impression values with respect to multiple sample synthesis candidate images, with respect to the impression axis Ax2 other than the impression axis Ax1. Then, multiple expressions corresponding to Formula (2) are obtained with respect to the impression axis Ax2 or the like other than the impression axis Ax1. In a case where the multiple expressions corresponding to Formula (2) are obtained, it is possible to generalize a coefficient a (a1, a2, or the like) from the multiple expressions, and to know a coefficient "a" with respect to Formula (1) for each impression axis. With respect to the synthesis candidate image I1 to I5, image analysis is performed with respect to each of the synthesis candidate image I1 to I5 by the CPU 7, and the presence or absence of a corresponding category for each item is detected. Thus, a value of a category "x" in Formula (1) is known, and impression values of the synthesis candidate images I1 to I5 are calculated (determined) for each impression axis from the coefficient "a" and the value of the category "x" by the CPU 7 (a synthesis candidate image impression value determination device).

Table 3 corresponds to Table 2, which shows an example of an impression value storage table in which impression values with respect to multiple sample background images are stored.

TABLE 3

| Impression axis | Sample image No. | Impression value | Item | | |
|---|---|---|---|---|---|
| | | | Frame | Color | — |
| Ax1 | No. 1 | L3 | Straight line | Warm | — |
| | No. 2 | L2 | Curve | Cold | — |
| | ... | ... | ... | ... | ... |
| Ax2 | No. 1 | L4 | Straight line | Cold | — |
| | No. 2 | L5 | Straight line | Warm | — |
| | ... | ... | | | — |
| ... | ... | ... | | | |

The impression value storage table shown in Table 3 similarly stores impression values with respect to sample background images for each of the impression axes Ax1 to Ax5 (in which the impression axes Ax1 to Ax5 are not limiting). Categories are stored for each item such as a frame or a color in accordance with the impression values. For example, in the case of the "frame" item, a "straight line" category or a "curve" category is stored, in the case of the "color" item, a "warm color" category or a "cold color" category is stored. When an impression value with respect to a certain impression axis is represented as f (impression axis), a category is represented as x, and a coefficient of the category is represented as b, with respect to the background images, Formula (3) is established in a similar way to Formula (1). Here, in a case where any one of the categories corresponds to an image, "1" is given, and in the other case, "0" is given.

$$f(\text{impression axis}) = \Sigma bx \qquad \text{Formula (3)}$$

For example, when a user subjectively inputs the impression value L3 on the impression axis Ax1 with respect to a sample background image No. 1, in a case where the "frame" of the background image is "straight line", "1" is given, in a case where the "frame" of the background image is "curve", "0" is given, in a case where the "color" of the background image is "warm color", "1" is given, and in a case where the "color" of the background image is "cold color", "0" is given. Then, Formula (4) is established.

$$L3 = b1 \times (\text{straight line}) + b \times (\text{warm color}) \ldots = b1 + b2 \ldots \qquad \text{Formula (4)}$$

In a case where the user subjectively inputs impression values of a different sample background image No. 2 or the like in advance with respect to the impression axis Ax1, multiple expressions corresponding to Formula (4) are obtained. Further, the user subjectively inputs impression values with respect to multiple sample background images, with respect to the impression axis Ax2 other than the impression axis Ax1. Then, multiple expressions corresponding to Formula (3) are similarly obtained with respect to the impression axis Ax2 or the like other than the impression axis Ax1. In a case where multiple expressions corresponding to Formula (4) are obtained, it is possible to generalize a coefficient b (b1, b2, or the like) from the multiple expressions, and to know a coefficient "b" with respect to Formula (3) for each impression axis. Then, with respect to the background images FR1 to FR5, image analysis is performed with respect to each of the background image FR1 to FR5 by the CPU 7, and the presence or absence of a corresponding category for each item is detected. Thus, a value of a category "x" in Formula (3) is known, and impression values of the background images FR1 to FR5 are calculated (determined) for each impression axis from the coefficient "b" and a value of a category "x1" value by the CPU 7 (a synthesis candidate image impression value determination device).

In this way, it is possible to calculate impression values with respect to the synthesis candidate images I1 to I5 and the background images FR1 to FR5. It is not necessary to say that it is similarly possible to calculate impression values with respect to synthesis candidate images other than the synthesis candidate images I1 to I5 and background images with respect to the background images FR1 to FR5.

A synthesis candidate image and a background image having close impressions can be synthesized to thereby obtain a synthetic image.

Second Embodiment

Figure 16:
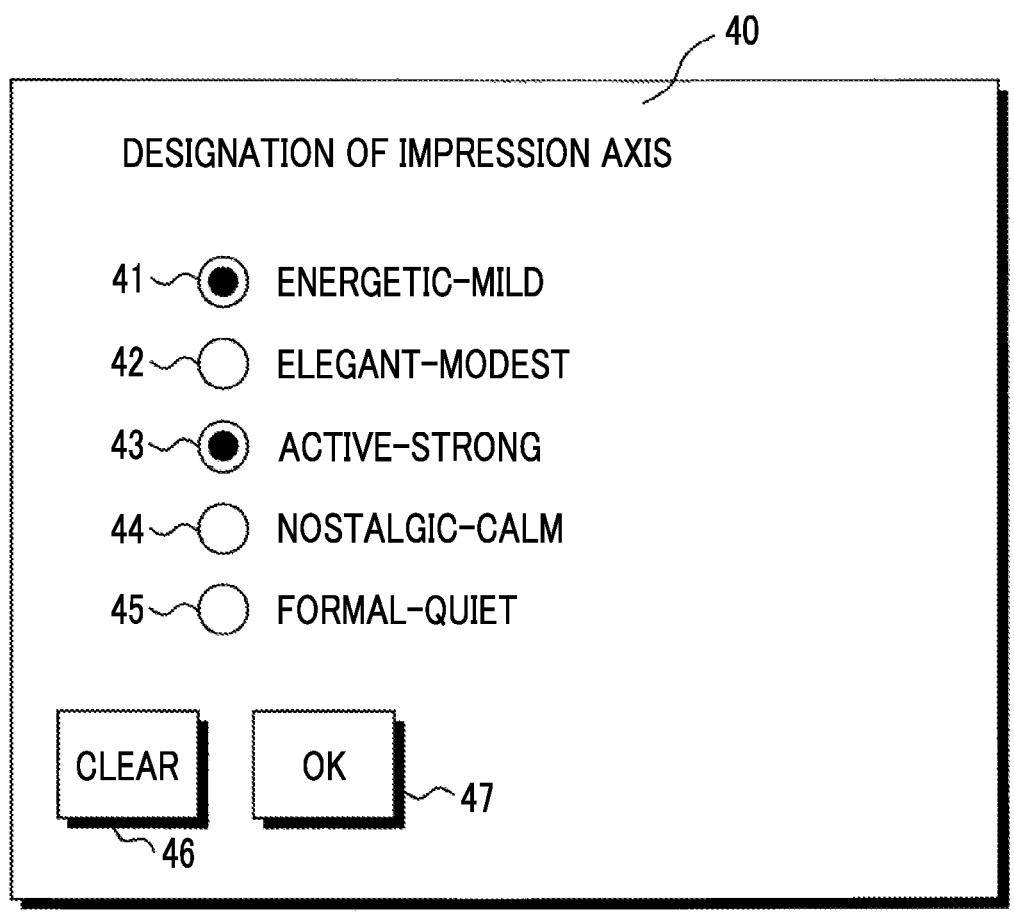
FIG. 16 is a diagram showing an example of an impression axis designating window.

FIG. 16 is an example of an impression axis designating window 40 displayed on a display screen of the display device 2 of the image synthesis apparatus 1.

In the above-described embodiment, impression values are determined with respect to the impression axes Ax1 to Ax5 that are determined in advance, but in this embodiment, impression values are determined with respect to impression axes designated by a user.

On the impression axis designating window 40, a name of a first impression axis Ax1 determined by an "energetic" impression and a "mild" impression, a name of a second impression axis Ax2 determined by an "elegant" impression and a "modest" impression, a name of a third impression axis Ax3 determined by an "active" impression and a "strong" impression, a name of a fourth impression axis Ax4 determined by a "nostalgic" impression and a "calm" impression, and a name of a fifth impression axis Ax5 determined by a "formal" impression and a "quiet" impression are displayed under the control of the display control device 3 (a second impression axis name display control device). Select buttons 41, 42, 43, 44, and 45 are displayed corresponding to the name of the first impression axis Ax1, the name of the second impression axis Ax2, the name of the third impression axis Ax3, the name of the fourth impression axis Ax4, and the name of the fifth impression axis Ax5, respectively. Under the select buttons 41 to 45, a clear button 46 on which "clear" is displayed and an OK button 47 on which "OK" is displayed are provided.

A user designates a certain select button corresponding to a name of an impression axis that the user wants to designate among the name of the first impression axis Ax1, the name of the second impression axis Ax2, the name of the third impression axis Ax3, the name of the fourth impression axis Ax4, and the name of the fifth impression axis Ax5, among the select buttons 41 to 45, using a mouse 9 (an impression axis name designation device, an impression axis designation device). In a case where the user clicks the OK button 47 using the mouse 9, an impression value is calculated with respect to an impression axis corresponding to the designated select button. In a case where the clear button 46 is clicked, the designated select button is cleared.

In this way, the user can designate an impression axis for which an impression value is to be determined. In the example shown in FIG. 16, the user designates a desired impression axis from the first impression axis Ax1 to the fifth impression axis Ax5 that are determined in advance, but the user may designate an arbitrary impression axis instead of designating the desired impression axis from the impression axes that are determined in advance. For example, by displaying an impression region shown in FIG. 8 on the display screen of the display device 2 and designating two arbitrary sensitivity words displayed in the impression region, it is possible to designate a desired impression axis.

Figure 17:
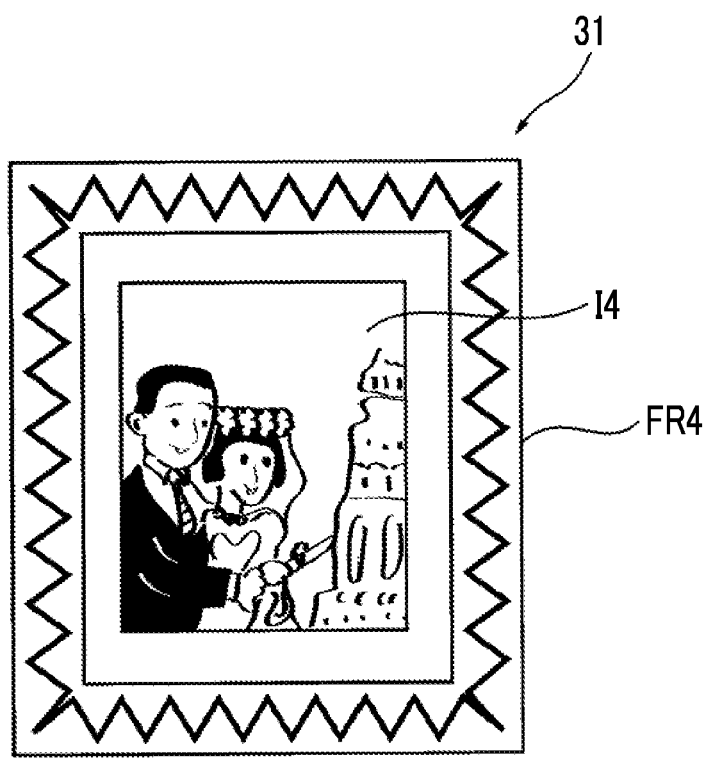
FIG. 17 is a diagram showing an example of a synthetic image.

FIG. 17 is a diagram showing a synthetic image 31 of the synthesis candidate image I4 and the background image FR4.

It is assumed that the select button 42 is selected by a user from the select buttons 41 to 45 displayed on the impression axis designating window 40 shown in FIG. 16, and that a combination of a synthesis candidate image and a background image having a small difference among differences between impression values of synthesis candidate images and impression values of background images, among the synthesis candidate images I1 to I5 and the background images FR1 to FR5, is determined by the CPU 7 with respect to the second impression axis Ax2 defined by "elegant" and "modest".

Referring to Table 1, it is assumed that combinations of synthesis candidate images and background images having small differences among the differences between the respective impression values of the synthesis candidate images I1 to I6 and the respective impression values of the background images FR1 to FR5, with respect to the second impression axis Ax2, are a combination of the synthesis candidate image I2 and the background image FR4 and a combination of the synthesis candidate image I4 and the background image FR4. Then, as shown in FIG. 15, in addition to the synthetic image 30 of the synthesis candidate image I2 and the background image FR4, as shown in FIG. 17, the synthetic image 31 of the synthesis candidate image I4 and the background image FR4 is obtained.

In the example shown in FIG. 16, impression axes are designated by displaying the impression axis designating window 40 and selecting the select buttons 41 to 45, but a plurality of impression axes for which the number of combinations of synthesis candidate images and background images, having a small difference between an impression value of one synthesis candidate image among the plurality of synthesis candidate images and an impression value of one background image among the plurality of background images, is equal to or greater than a threshold value may be determined by the CPU 7 (a first impression axis determination device) with respect to impression axes that are determined in advance. With respect to the plurality of impression axes determined in this way, combinations of synthesis candidate images and background images having small differences between impression values of the synthesis candidate images and impression values of the background images is small may be determined by the CPU 7 (a combination determination device).

Figure 18:
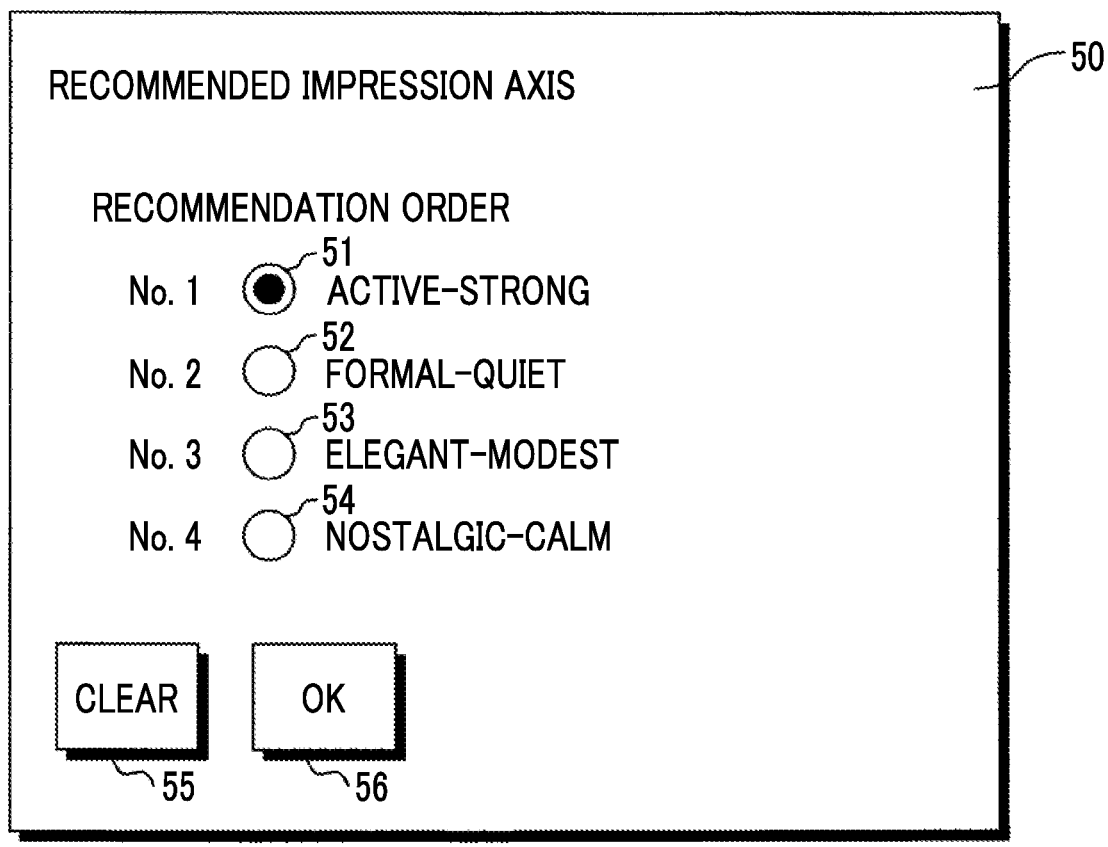
FIG. 18 is a diagram showing a recommended impression axis designating window.

FIG. 18 is a diagram showing an example of a recommended impression axis display window.

A recommended impression axis display window 50 is displayed on the display screen of the display device 2 under the control of the display control device 3.

On the recommended impression axis display window 50, impression axis names indicating a plurality of impression axes for which the number of combinations of synthesis candidate images and background images, having a small difference between an impression value of one synthesis candidate image among the plurality of synthesis candidate images and an impression value of one background image among the plurality of background images, is equal to or greater than a threshold value among impression axes that are determined in advance are displayed in an ascending order of the differences. Specifically, a name of the third impression axis Ax3 defined by the "active" impression and the "strong" impression, a name of the fifth impression axis Ax5 defined by the "formal" impression and the "quiet" impression, a name of the second impression axis Ax2 defined by the "elegant" impression and the "modest" impression, and a name of the fourth impression axis Ax4 defined by the "nostalgic" impression and the "calm" impression are displayed in a recommended order based on their numbers on the recommended impression axis display window 50 by the display control device 3 (a third impression axis name display control device).

A select button 51 corresponding to the name of the third impression axis Ax3 defined by the "active" impression and the "strong" impression, a select button 52 corresponding to the name of the fifth impression axis Ax5 defined by the "formal" impression and the "quiet" impression, a select button 53 corresponding to the name of the second impression axis Ax2 defined by the "elegant" impression and the "modest" impression, and a select button 54 corresponding to the name of the fourth impression axis Ax4 defined by the "nostalgic" impression and the "calm" impression are displayed on the recommended impression axis display window 50.

Under the select buttons 51 to 54, a clear button 55 on which "clear" is displayed and an OK button 56 on which "OK" is displayed are provided.

A user selects a name of a desired impression axis from the names of the impression axes displayed as the recommended impression axes through the select buttons 51 to 54 using the mouse 9. A combination of a synthesis candidate image and a background image having a small difference among differences between impression values of synthesis candidate images and impression values of background images with respect to the selected impression axis is determined by the CPU 7. For example, in the example shown in FIG. 18, since the select button 51 is selected, the third impression axis Ax3 defined by "active" and "strong" that is firstly recommended is selected, and a combination of a synthesis candidate image and a background image having a small difference among differences between impression values of synthesis candidate images and impression values of background images with respect to the third impression axis Ax3 is determined by the CPU 7.

In this way, it is possible to determine various impression axes other than the plurality of impression axes that are determined in advance, and to determine a combination of a synthesis candidate image and a background image having a small difference among differences between impression values of synthesis candidate images and impression values of background images with respect to the plurality of determined impression axes.

Third Embodiment

Figure 19:
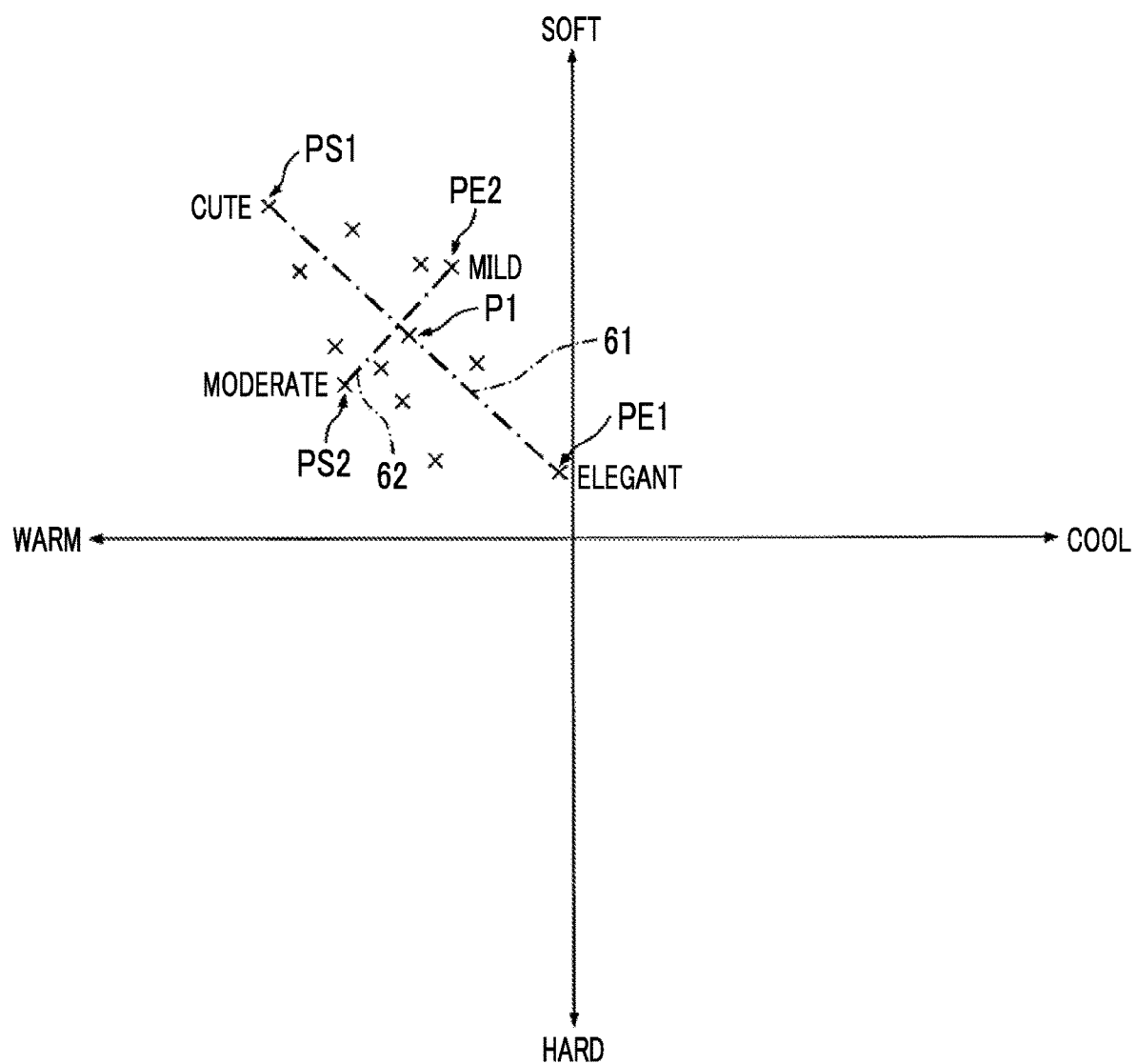
FIG. 19 is a diagram showing an example of an impression region.

FIG. 19 is a diagram showing an example of an impression region defined by two standard impression axes that are determined in advance.

FIG. 19 is a diagram corresponding to FIG. 8, in which a transverse axis is an impression axis defined by "warm" and "cool" and a longitudinal axis is an impression axis defined by "soft" and "hard". Impression values of the synthesis candidate images I1 to I5 and the background images FR1 to FR5 on the transverse axis and the longitudinal axis are plotted (indicated by X marks) in an impression region defined by the transverse axis and the longitudinal axis.

In FIG. 19, a state of distribution of impression values is detected by the CPU 7, and at least one impression axis among an impression axis corresponding to an impression in a direction in which the distribution of the impression values of the synthesis candidate images I1 to I5 is wide, an impression axis corresponding to an impression in a direction in which the distribution of the impression values of the synthesis candidate images I1 to I5 is narrow, an impression axis corresponding to an impression in a direction in which the distribution of the impression values of the background images FR1 to FR5 is wide, and an impression axis corresponding to an impression in a direction in which the distribution of the impression values of the background images FR1 to FR5 is narrow is determined by the CPU 7 (a second impression axis determination device). With respect to the impression axis determined in this way, a combination of a synthesis candidate image and a background image having a small difference among differences between the impression values of the synthesis candidate images and the impression values of the background images is determined by the CPU 7. At least one of the impression axis corresponding to the impression in the direction in which the distribution of the impression values is wide or the impression axis corresponding to the impression in the direction in which the distribution of the impression values is narrow may be determined, without distinguishing between the synthesis candidate images I1 to I5 and the background images FR1 to FR5. In the example shown in FIG. 19, the impression region is a two-dimensional region defined by two impression axes formed by the longitudinal axis and the transverse axis, but in the case of a three or more dimensional region defined by three or more impression axes, impression axes may be determined in a similar way.

The determination of the impression axis corresponding to the impression in the direction in which the distribution of the impression values that are distributed in the impression region as shown in FIG. 19 is wide corresponds to calculation of a regression line on the basis of the distribution of the impression values. A method for calculating the regression line is known, but specific processes are as follows. First, a standard deviation σx in a transverse axis direction and a standard deviation σy in a longitudinal axis direction indicated by impression values of a plurality of synthesis candidate images are calculated with respect to respective impression axes of a transverse axis and a longitudinal axis in an impression region, and a covariance of the respective images in the respective axes of the transverse axis and the longitudinal axis is calculated. By dividing the calculated covariance by a product obtained by multiplication of standard deviations of respective impressions in the transverse axis and the longitudinal axis, a correlation coefficient "r" of the plurality of synthesis candidate images is calculated. The regression line is represented as shown in Formula (5).

$$(x-x0)/a=(y-y0)/b \quad \text{Formula (5)}$$

Here, x0 represents an average value of impression values of respective images in the transverse axis, and y0 represents an average value of the impression values of the respective images in the longitudinal axis. Here, "a" and "b are unfixed coefficients.

Further, since Formula (6) is established, it is possible to calculate "a" and "b" from Formula (5) and Formula (6), and thus, it is possible to specifically calculate an impression axis 61 in FIG. 19.

$$σx/a=r·(σy/b) \quad \text{Formula (6)}$$

One end point PS1 and the other end point PE1 in the impression axis 61 shown in FIG. 19 may be set as a starting point and an ending point in a distribution of impression values in the direction of the impression axis 61 among distributions of the impression values.

Further, an impression axis 62 corresponding to the impression in the direction in which the distribution of the impression values that are distributed in the impression region is narrow may be considered as an axis vertical to the impression axis 61 corresponding to the impression in the direction where the distribution of impression values is wide. In this case, one end point PS2 and the other end point PE2 in the impression axis 62 may be set as a starting point and an ending point in a distribution of impression values in the direction of the impression axis 62 among distributions of the impression values.

With respect to the impression axes 61 and 62 that are determined in this way, a combination of a synthesis candidate image and a background image having a small difference among differences between impression values of synthesis candidate images and impression values of background images is determined. The distribution of the impression values in FIG. 19 is related to the synthesis candidate images I1 to I5 and the background images FR1 to FR5, but it is preferable that the number of synthesis candidate images and the number of background images are set to be larger, respectively.

As the processing unit that executes the above-described processes, instead of the CPU 7 that executes software to function as a variety of processing units, for example, a dedicated electric circuit that is a processor having a circuit configuration that is dedicatedly designed for executing a specific process, such as a programmable logic device of which a circuit configuration is changeable after manufacturing such as a field-programmable gate array (FPGA), or an application specific integrated circuit (ASIC) may be used.

One processing unit may be configured of one processor among the variety of processors, or may be configured of a combination of two or more same or different kinds of processors (for example, a combination of a plurality of FPGAs, or a combination of a CPU and an FPGA. As an example in which a plurality of processing units is configured as one processor, first, there is a configuration in which one processor is configured of a combination of one or more CPUs and software and the processor functions as the plurality of processing units, as represented by a computer such as a client computer or a server. Secondly, as represented by a system-on-chip, or the like, there is a configuration in which a processor that realizes overall functions of a system that includes a plurality of processing units using one integrated circuit (IC) chip is used. In this way, various processing units may be configured by using one or more various processors as a hardware structure.

Further, more specifically, the hardware structure of the various processors is an electric circuit in which circuit elements such as semiconductor elements are combined.

In the above-described embodiment, the image synthesis apparatus 1 is disclosed as a dedicated apparatus, but may be configured by a personal computer, may be configured by a so-called smart device such as a smartphone or a tablet device, or may be a mobile phone such as a feature phone, instead of the dedicated apparatus.

What is claimed is:

1. An image synthesis apparatus comprising:
   a processor;
   a memory comprising instructions to be executed by the processor,
   wherein the processor is configured to:
   receive a plurality of synthesis candidate images;
   receive a plurality of background images;
   determine impression values of each of the plurality of synthesis candidate images by a line from coordinates of the impression values of each of the plurality of synthesis candidate images to a plurality of impression axes;
   determine impression values of each of the plurality of background images by a line from coordinates of the impression values of each of the plurality of background images to the plurality of impression axes;
   determine a combination of a synthesis candidate image and a background image having a small difference among differences between the impression values of the synthesis candidate image and the impression values of the background image with respect to at least one impression axis among the plurality of impression axes; and
   synthesize the synthesis candidate image and the background image of the combination to generate a synthetic image.

2. The image synthesis apparatus according to claim 1, wherein the processor is further configured to display the synthetic image.

3. The image synthesis apparatus according to claim 1, further comprising:
   wherein the processor is configured to display a name of the at least one impression axis.

4. The image synthesis apparatus according to claim 1, wherein the processor is configured to calculate the impression values of each of the plurality of synthesis candidate images with respect to the plurality of impression axes, and
   calculate the impression values of each of the plurality of background images with respect to the plurality of impression axes.

5. The image synthesis apparatus according to claim 1, wherein the processor is configured to determine the impression values of the synthesis candidate image on the basis of impression values stored in a synthesis candidate image impression value storage device for storing the impression values of each of the plurality of synthesis candidate images with respect to the plurality of impression axes, and
   to determine the impression values of the background image on the basis of impression values stored in a background image impression value storage device for storing the impression values of each of the plurality of background images with respect to the plurality of impression axes.

6. The image synthesis apparatus according to claim 1, wherein the processor further configured to designate the plurality of impression axes.

7. The image synthesis apparatus according to claim 1, wherein the processor is configured to determine the combination of the synthesis candidate image and the background image with respect to an impression axis on which the smallest difference among the differences between the impression values of the synthesis candidate image and the impression values of the background image is present.

8. The image synthesis apparatus according to claim 1, wherein the processor is further configured to:
   display names of the plurality of impression axes; and
   designate a name of at least one impression axis among the names of the plurality of impression axes displayed
   determine the combination of the synthesis candidate image and the background image having the small difference among the differences between the impression values of the synthesis candidate image and the impression values of the background image with respect to an impression axis corresponding to the name of the at least one impression axis.

9. The image synthesis apparatus according to claim 1, wherein the processor is further configured to:
   determine impression axes for which the number of combinations of synthesis candidate images and background images, having a small difference between an impression value of one synthesis candidate image among the plurality of synthesis candidate images and an impression value of one background image among the plurality of background images, is equal to or greater than a threshold value, as the plurality of impression axes.

10. The image synthesis apparatus according to claim 9, wherein the processor is further configured to:
    display the names of the impression axes in an ascending order of the differences.

11. The image synthesis apparatus according to claim 1, wherein the processor is further configured to:
    determine the plurality of impression axes on the basis of distribution of coordinates of the impression values of a plurality of synthesis candidate images and distribution of coordinates of the impression values of a plurality of background images in a region defined by two impression axes or three impression axes.

12. The image synthesis apparatus according to claim 11, wherein the processor is configured to determine at least one impression axis among an impression axis corresponding to an impression in a direction in which the distribution of the coordinates of the impression values of the plurality of synthesis candidate images is wide, an impression axis corresponding to an impression in a direction in which the distribution of the coordinates of the impression values of the plurality of synthesis candidate images is narrow, an impression axis corresponding to an impression in a direction in which the distribution of the coordinates of the impression values of the plurality of background images is wide, or an impression axis corresponding to an impression in a direction in which the distribution of the coordinates of the impression values of the plurality of background images is narrow.

13. An image synthesis method comprising:
    receiving a plurality of synthesis candidate images;
    receiving a plurality of background images;

determining impression values of each of the plurality of synthesis candidate images by a line from coordinates of the impression values of each of the plurality of synthesis candidate images to a plurality of impression axes;

determining impression values of each of the plurality of background images by a line from coordinates of the impression values of each of the plurality of background images to the plurality of impression axes;

determining a combination of a synthesis candidate image and a background image having a small difference among differences between the impression values of the synthesis candidate image and the impression values of the background image with respect to at least one impression axis among the plurality of impression axes; and synthesizing the synthesis candidate image and the background image of the combination to generate a synthetic image.

14. A non-transitory recording medium storing a computer-readable program that controls a computer of an image synthesis apparatus so that the computer of the image synthesis apparatus executes:

a process of receiving a plurality of synthesis candidate images;

a process of receiving a plurality of background images;

a process of determining impression values of each of the plurality of synthesis candidate images by a line from coordinates of the impression values of each of the plurality of synthesis candidate images to a plurality of impression axes;

a process of determining impression values of each of the plurality of background images by a line from coordinates of the impression values of each of the plurality of background images to the plurality of impression axes;

a process of determining a combination of a synthesis candidate image and a background image having a small difference among differences between the impression values of the determined synthesis candidate image and the impression values of the determined background image, with respect to at least one impression axis among the plurality of impression axes; and a process of synthesizing the synthesis candidate image and the background image of the determined combination to generate a synthetic image.

* * * * *